US008184909B2

(12) United States Patent
Miarecki et al.

(10) Patent No.: US 8,184,909 B2
(45) Date of Patent: May 22, 2012

(54) METHOD FOR COMPARING SECTIONED GEOMETRIC DATA REPRESENTATIONS FOR SELECTED OBJECTS

(75) Inventors: Michael S. Miarecki, Enfield, CT (US); Jeffrey D. Lancaster, Coventry, CT (US)

(73) Assignee: United Technologies Corporation, Hartford, CT (US)

( * ) Notice: Subject to any disclaimer, the term of this patent is extended or adjusted under 35 U.S.C. 154(b) by 1001 days.

(21) Appl. No.: 12/215,070

(22) Filed: Jun. 25, 2008

(65) Prior Publication Data

US 2009/0324093 A1 Dec. 31, 2009

(51) Int. Cl.
G06K 9/00 (2006.01)
G06K 9/46 (2006.01)
G06K 9/62 (2006.01)
G06K 9/32 (2006.01)
G06T 11/20 (2006.01)

(52) U.S. Cl. ........ 382/203; 382/141; 382/215; 382/298; 345/441

(58) Field of Classification Search ................. 382/203, 382/141, 215, 298; 345/441
See application file for complete search history.

(56) References Cited

U.S. PATENT DOCUMENTS

| 5,521,847 | A | * | 5/1996 | Ostrowski et al. | 702/152 |
|---|---|---|---|---|---|
| 5,970,170 | A | * | 10/1999 | Kadashevich et al. | 382/187 |
| 6,029,173 | A | * | 2/2000 | Meek et al. | 707/696 |
| 6,088,663 | A | * | 7/2000 | Wang | 702/179 |
| 6,205,240 | B1 | | 3/2001 | Pietrzak et al. | |
| 6,526,550 | B1 | | 2/2003 | Badding et al. | |
| 6,636,217 | B1 | * | 10/2003 | Hill | 345/441 |
| 6,748,112 | B1 | * | 6/2004 | Nguyen et al. | 382/203 |
| 6,760,117 | B2 | | 7/2004 | Slatter | |
| 6,985,639 | B1 | * | 1/2006 | Alwar et al. | 382/286 |
| 2007/0107180 | A1 | | 5/2007 | Mentz et al. | |

FOREIGN PATENT DOCUMENTS

| CN | 200610116670.5 | 9/2006 |
|---|---|---|
| JP | 63191911 A | 8/1988 |
| JP | 04163803 A | 6/1992 |
| JP | 10038543 A | 2/1998 |
| JP | 10062144 A | 3/1998 |
| JP | 11351824 A | 12/1999 |
| JP | 2000028330 A | 1/2000 |
| JP | 2000348070 A | 12/2000 |
| JP | 2001084376 A | 3/2001 |
| JP | 2002230357 A | 8/2002 |
| JP | 2002236925 A | 8/2002 |
| JP | 2004318336 A | 11/2004 |
| JP | 2004333371 A | 11/2004 |
| JP | 2005031952 A | 2/2005 |
| JP | 2007103645 A | 4/2007 |

* cited by examiner

Primary Examiner — Kathleen Y Dulaney
(74) Attorney, Agent, or Firm — Kinney & Lange, P.A.

(57) ABSTRACT

A method for comparing a plurality of geometrical data representations each representing a spatial boundary surface of a corresponding geometrical object which surface changes over a selected extent of the object bounded thereby through providing the plurality of geometrical data representations on a common format basis, including scaling so as to each to have a common selected extent, to thereby result in a plurality of standardized spatial boundary surface geometrical data representations and comparing them at a plurality of matching section locations along each of the common extents at each of which there is a section outline curve representations. Comparing selected features of the commonly scaled section outline curve representations for such representations at corresponding ones of the selected matched section locations provides a basis for determining similarity therebetween.

18 Claims, 6 Drawing Sheets

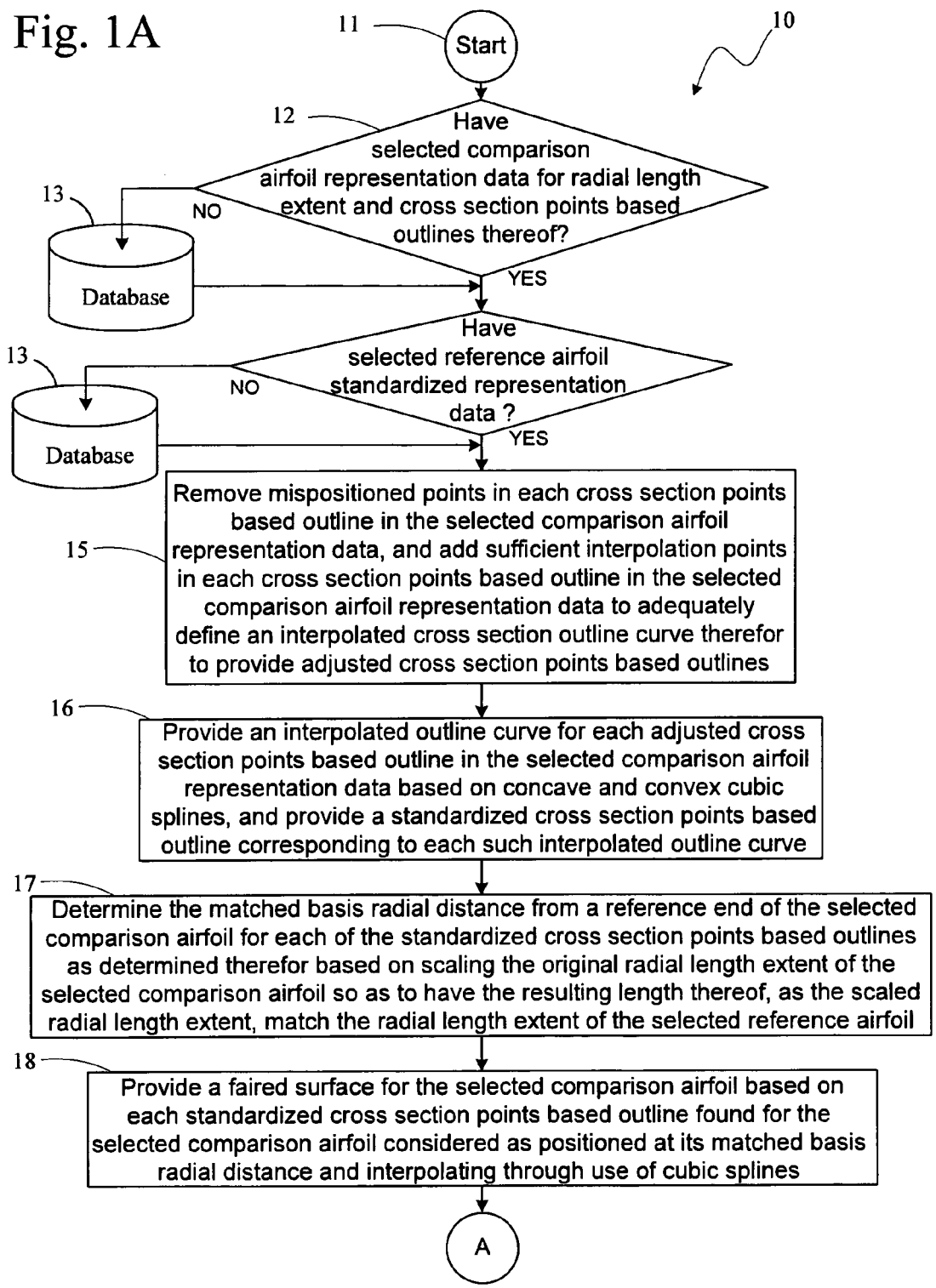

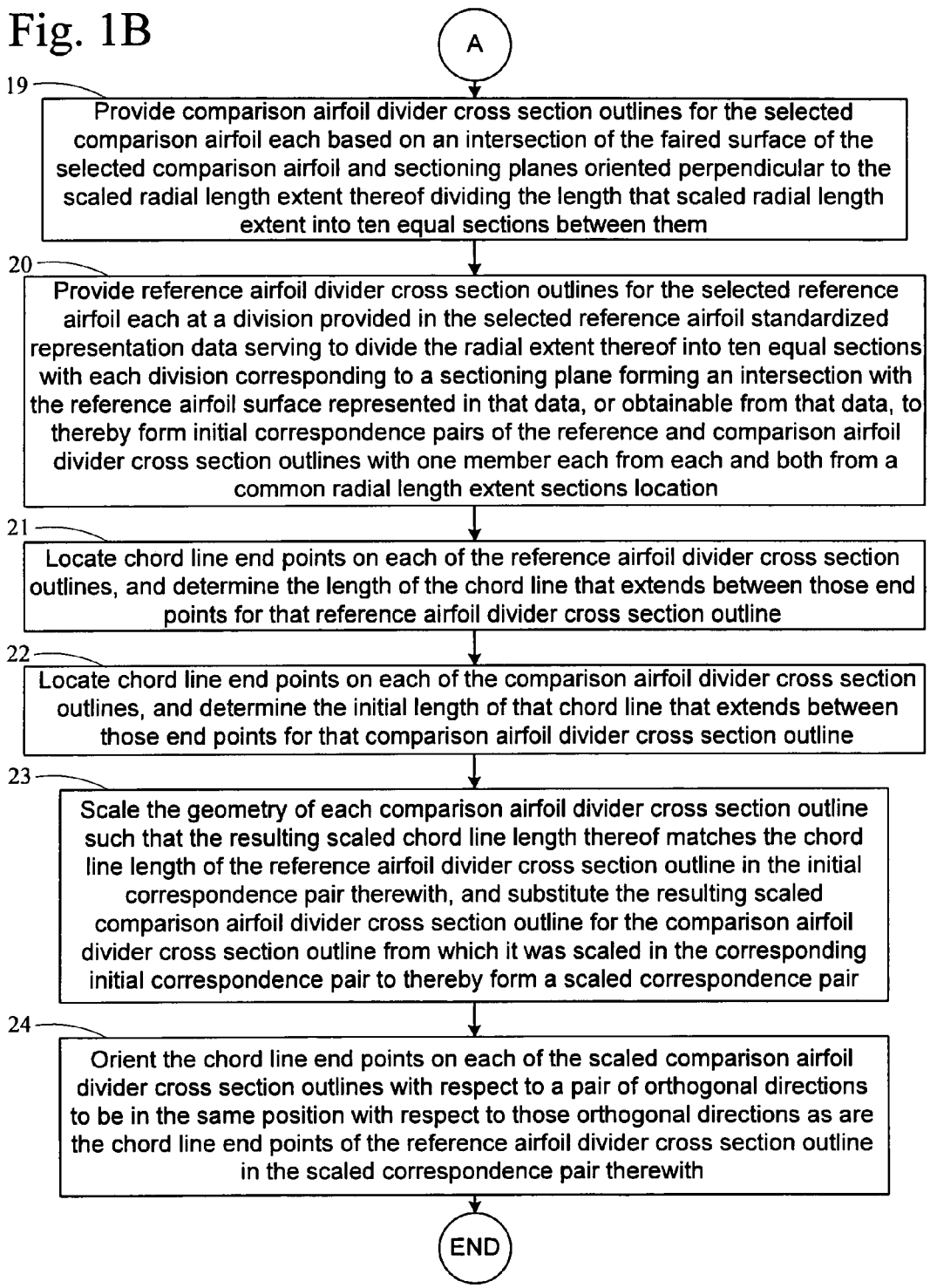

METHOD FOR COMPARING SECTIONED GEOMETRIC DATA REPRESENTATIONS FOR SELECTED OBJECTS

BACKGROUND

The present invention relates to comparing plural sections of geometric data representations corresponding to differing objects and, more particularly, to objects with diverse and relatively complicated geometries such as airfoils, engine parts like those used in gas turbines for aircraft and industrial power, and the like.

Objects with diverse and complicated geometries must often be compared to determine any similarities or differences between those geometries. There are many examples including sorting a collection of objects as a basis for placing them each at a location assigned to objects of a corresponding specified geometry, identifying observed objects as belonging or not to a group of specified geometry objects, evaluating differences in designs of different but similar objects, etc.

In current technology, many objects have their geometries represented in some kind of computing machine representation having corresponding geometric data files which may be stored in digital databases to be accessible by computer operators having computers with suitable computer programs available for carrying out desired procedures with respect thereto. Alternatively, object geometries may be stored in a variety of ways in paper files to be accessible directly by humans. Thus, there are different methodologies available for constructing such representations as well as many different file formats available for storing the resulting representations. However, comparisons of the geometric data files of differing objects to determine the differences between the objects themselves is usually done faster, cheaper and more accurately using some sort of computing machine. Hence, many geometric data files on paper will be converted to digitally based files in computer accessible databases as the basis for making such comparisons. This is especially true for objects with more complicated geometries such as airfoils, engine parts like those used in gas turbines for aircraft and industrial power, or the like, having curvilinear outlines that change over various extents of thereof. Examples of such engine parts include but are not limited to disks, shafts, rotor disk slots, dovetails, firtrees, shrouded blades and other parts in which dimensional accuracy is important or even critical.

Commonly, such objects, having a geometry characterized by outline surfaces that change over some extent direction, are represented for digitally based files in computer accessible databases in sections each with data for each such section specifying the corresponding section outline curve and the corresponding section position along that extent direction. Thus, there is a desire to have such geometrical data representations in plural differing sections of the entire geometry for many differing objects of many kinds each being provided on a common format basis to enable making accurate comparisons therebetween including comparative analyses.

SUMMARY

The present invention provides a method for comparing a plurality of geometrical data representations each representing a spatial boundary surface of a corresponding geometrical object which surface changes over a selected extent of the object bounded thereby through providing the plurality of geometrical data representations on a common format basis, including scaling so as to each to have a common selected extent, to thereby result in a plurality of standardized spatial boundary surface geometrical data representations. Selecting a plurality of section locations along each of the common extents of the standardized spatial boundary surface geometrical data representations so as to have the positions of the section locations along each common extent matched to those section locations along each of the remaining common extents leads to providing a plurality of section outline curve representations for each of the plurality of standardized spatial boundary surface geometrical data representations about selected ones of the matched section locations.

Determining a pair of endpoints for each of the plurality of section outline curve representations at the selected ones of the matched section locations for each of the plurality of standardized spatial boundary surface geometrical data representations, and the chord length between each of the pairs of endpoints, leads to scaling the section outline curve representations to each have a common chord length at a corresponding one of the selected matched section locations for each of the plurality of standardized spatial boundary surface geometrical data representations to form commonly scaled section outline curve representations for the corresponding one of the selected matched section locations from each of the plurality of standardized spatial boundary surface geometrical data representations. Comparing selected features of the commonly scaled section outline curve representations for the corresponding one of the selected matched section locations provides a basis for determining similarity therebetween.

BRIEF DESCRIPTION OF THE DRAWINGS

FIGS. 1A and 1B together show a flow chart embodying therein at least a portion of the present invention, FIGS. 2A and 2B each show example representations of geometrical outlines of airfoils resulting from use of the present invention.

DETAILED DESCRIPTION

Figure 2A:
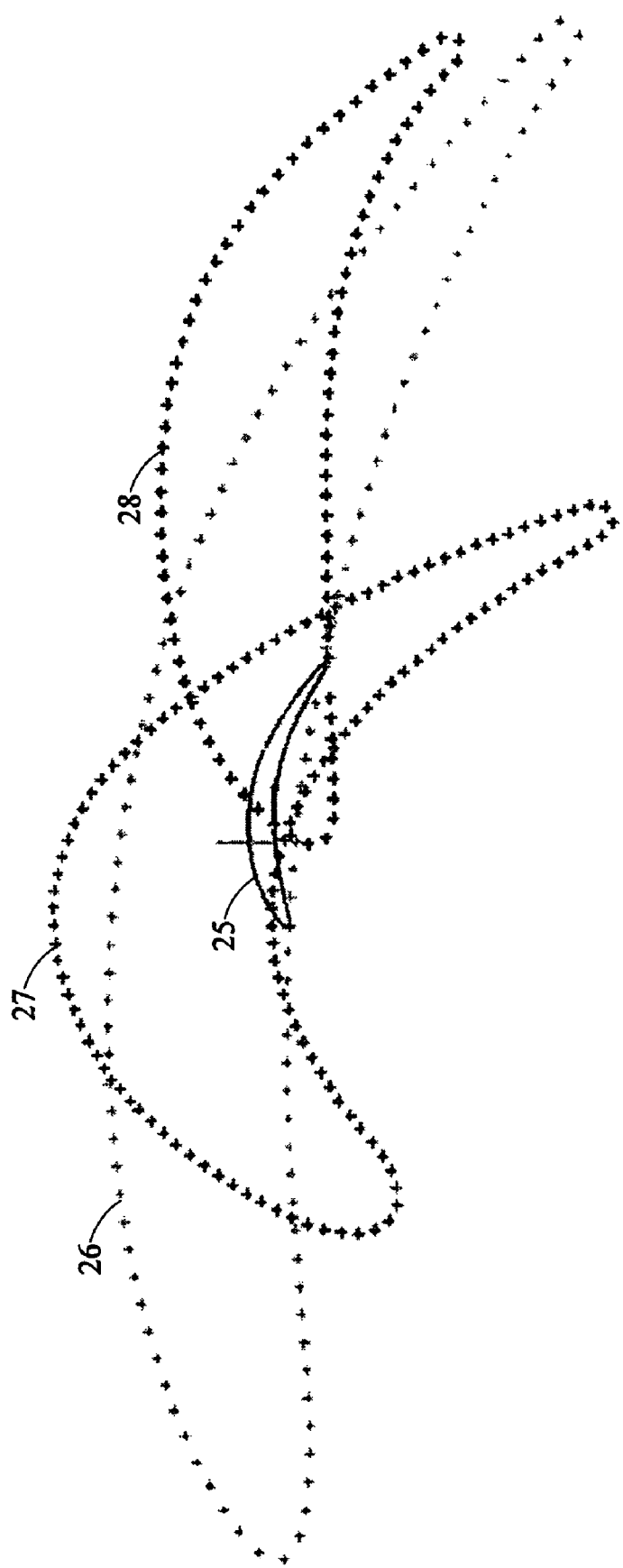

As stated above, there are different methodologies available for constructing geometric representations of objects as well as many different file formats available for storing the resulting representations. This results because various objects, even similar objects, have often been designed or fabricated using different kinds of methodologies and equipment, and been done by different people. If accurate, detailed comparisons are to be made between different but similar objects using computing machines, the geometric representations available for each must be provided in geometric representation data files, and these files must be formed for each of the various objects using a common basis.

In general, a common way to represent objects having a geometry characterized by outline surfaces that change over some extent of the object in some direction is to consider the object divided into sections more or less perpendicular to that direction of object extent, or to divide the object representation data into sections along that direction, i.e. cross sections of the object or object data. Typically, the sections are thin enough to have the strip of surface bounding the object section reasonably represented by an outline curve in the strip surface about each such section. Thus, each cross section resulting from the division along the extent direction is geometrically characterized by a distance along the extent direction from some selected reference point and bounded by an outline curve in the surface strip that more extensively also bounds that section. Again typically, the boundary outline curve is represented by an assemblage of outline points therealong often with each such point being referenced by corresponding radial and angular coordinates measured from suitable reference points. Assuming there are such representations for the geometrical outlines of different objects with data for each such section therein specifying the corresponding cross section points based outline and the corresponding cross section position along a suitable extent direction stored in a suitable digital database, they must be put on a common basis to allow accurate comparisons of the geometries of each such object, including the plural sections of those geometries, by a computing machine or system.

A methodology for doing so is presented in an example involving airfoils that is set forth in a flow chart, 10, in FIGS. 1A and 1B beginning at a start balloon, 11. The flow chart assumes that a selected reference airfoil is already represented in a database by standard representation data for cross sections thereof along its radial length extent, and that a comparison airfoil has been selected to be compared with that reference airfoil. However, this comparison airfoil, although also being represented in the database by data for sections thereof along its radial length extent, has this representation in a form that is not the standardized form so that the cross sections data for each are; not on a common basis at the outset.

Thus, a suitable computer system first determines in a decision diamond, 12, whether it has the representation data for the radial length extent and the cross section based points outline for each division cross section of the selected comparison airfoil, or whether that data must be first acquired from a database, 13. Similarly, the computer system determines in a decision diamond, 14, whether it has the standardized representation data for the radial length extent and the cross section based points outline for each division cross section of the reference airfoil, or again whether that data must be first acquired from database 13.

Next, the computer system in a performance block, 15, removes any outlier points from the cross section points based outline for each cross section that do not sufficiently connect with a smooth curve joining the remaining ones of those points, i.e. any mispositioned points in those outline points for each cross section. In addition, sufficient interpolation points are added to the remaining points in the cross section points based outline for each cross section needed to adequately define an interpolated cross section outline curve for that cross section. In the following performance block, 16, an interpolated outline curve is provided by the computer system for each adjusted cross section points based outline using concave and convex cubic splines, and this curve is used to provide a standardized cross section points based outline with its points being in standardized positions in being taken from standardized positions along that curve.

Thereafter, the position for each of the standardized cross section points based outlines determined above for the comparison airfoil is found by the computer system on a comparable basis to the positions they would have along the radial length extent of the reference airfoil in a further performance block, 17. This is accomplished by scaling the length of the original radial length extent of the comparison airfoil to provide a scaled radial length extent therefor that matches the radial length extent of the reference airfoil. Then the standardized cross section points based outlines for the comparison airfoil are each taken to be located at a distance from the reference end of the comparison airfoil (the matched basis radial distance) that is the same fraction of this scaled radial length extent for the comparison airfoil that those standardized cross section points based outline locations were of the original radial length extent of the comparison airfoil before the scaling.

These standardized cross section points based outlines for the comparison airfoil each located at its corresponding matched basis radial distance allow the computer system, in the next performance block, 18, to determine a faired surface for the comparison airfoil that passes through the standardized points in each of the standardized cross section points based outlines so positioned at its corresponding matched basis radial distance from the reference end of the comparison airfoil. Between these cross section points based outlines, the faired surface is determined through interpolation based on using cubic splines.

An alternative set of cross section points based outlines is then provided by the computer system for the selected comparison airfoil each in the following performance block, 19, in FIG. 1B. The transition path from FIG. 1A to FIG. 1B is indicated by a transition balloon, A, in each figure. Each member of this alternative set is based on a corresponding intersection of the comparison airfoil faired surface and one of a set of sectioning planes. These sectioning planes, each positioned oriented perpendicularly to the scaled radial length extent, are also positioned to divide the length of that scaled radial length extent into ten equal length sections between them. Thus, there are also resulting intersections between these sectioning planes and the comparison airfoil faired surface with each being equally spaced from the next along this scaled radial length extent to thereby provide a set of equally spaced comparison airfoil divider cross section outlines.

Similarly, a set of equally spaced reference airfoil divider cross section outlines is provided by the computer system for the reference airfoil in another performance block, 20, equal in number to the set of equally spaced comparison airfoil divider cross section outlines, these reference airfoil divider cross section outlines being provided from the standard representation data for cross sections of the reference airfoil along its radial length extent (if this standard cross section data is not already available in the database in the form of the desired set of equally spaced reference airfoil divider cross section outlines). If not so available already, the standard representation data may be such that divisions thereof may be conveniently provided each at a corresponding one of ten equal sections of the radial length extent of the reference airfoil. Each such section then corresponds to a sectioning plane intersecting the surface of the reference airfoil represented in the standard representation data to thereby determine the set of equally spaced reference airfoil divider cross section outlines. Otherwise, a faired surface can be provided for the reference airfoil from the standard representation data therefor to be used with such sectioning planes in determining this set.

Thus there is now a set of comparison airfoil divider cross section outlines equally spaced along the scaled radial length extent thereof and a set of reference airfoil divider cross section outlines equally spaced along its radial length extent which is equal in length to the scaled radial length extent of the comparison airfoil. Each set has a member in it corresponding to the member of the other set that is located at an equal fraction of the sections of the radial length extents involved with each set from the reference ends thereof. This allows comparing correspondence pairs of outlines with each pair having a member from each set to determine how similar the surface geometries are of each airfoil at each distance location along its radial length extent at which there is provided a corresponding pair of cross section outline members to represent the airfoil geometries there. However, this is conveniently done after scaling each comparison airfoil divider cross section outline, and reorienting it, as needed to match the scale and orientation of its corresponding reference airfoil divider cross section outline in a correspondence pair.

This process is begun in a another performance block, 21, by locating the end points of the chord line joining the leading and trailing edges of the reference airfoil at the locations of the radial length extent sections thereof. That is, the end points of the chord line for each of the reference airfoil divider cross section outlines between the corresponding leading and trailing edge points of each are to be determined. This is typically accomplished by the computer system inscribing circles inside each of the reference airfoil divider cross section outlines through the extent thereof between circles near to, or even as close as possible to, each of the opposite ends thereof, the locus of the resulting circle centers then being taken to define a mean line curve for that cross section outline. Extrapolating the two opposite ends of this curve to each intersect a nearby point on this cross section outline thereby provides the two chord line end points on that cross section outline. Each of the reference airfoil divider cross section outlines, having in this manner the chord line end points therefor so determined, also has the length of that chord line between those end points determined by the computer system.

In a similar manner, the end points of the chord line for each of the comparison airfoil divider cross section outlines between the corresponding leading and trailing edge points of each are determined by the computer system in a further performance block, 22. Again, with each of the comparison airfoil divider cross section outlines chord line end points having been determined, the computer system determines the initial length of that chord line between those end points.

Thereafter, in a following performance block, 23, the computer system scales the geometry of each comparison airfoil divider cross section outline such that the resulting scaled chord line length thereof matches the chord line length of the reference, airfoil divider cross section outline that is in the correspondence pair with that comparison airfoil divider cross section outline. To do so, the computer system determines the ratio of the lengths of the chord lines of the comparison and reference airfoil divider cross section outlines and multiplicatively applies that ratio to the coordinate lengths of each point in the comparison airfoil divider cross section outline to scale that outline so as to result in a scaled comparison airfoil divider cross section outline with the same chord length as that occurring in the reference airfoil divider cross section outline.

The chord line end points on each of the scaled comparison airfoil divider cross section outlines determine a spatial direction that is then oriented with respect to a pair of selected orthogonal spatial directions so as to be in the same position with respect to those orthogonal directions as the spatial direction defined by the chord line end points of the reference airfoil divider cross section outline in the same scaled correspondence pair as indicated in the final performance block, 24, in FIG. 1B. Conveniently, these selected orthogonal spatial directions will be taken as forming a two dimensional Cartesian coordinate system having an abscissa, or x, axis along one of these orthogonal directions and an ordinate, or y, axis along the other (a third dimension for a three dimensional Cartesian coordinate system would point toward the reader from the plane of the figure).

Figure 2B:
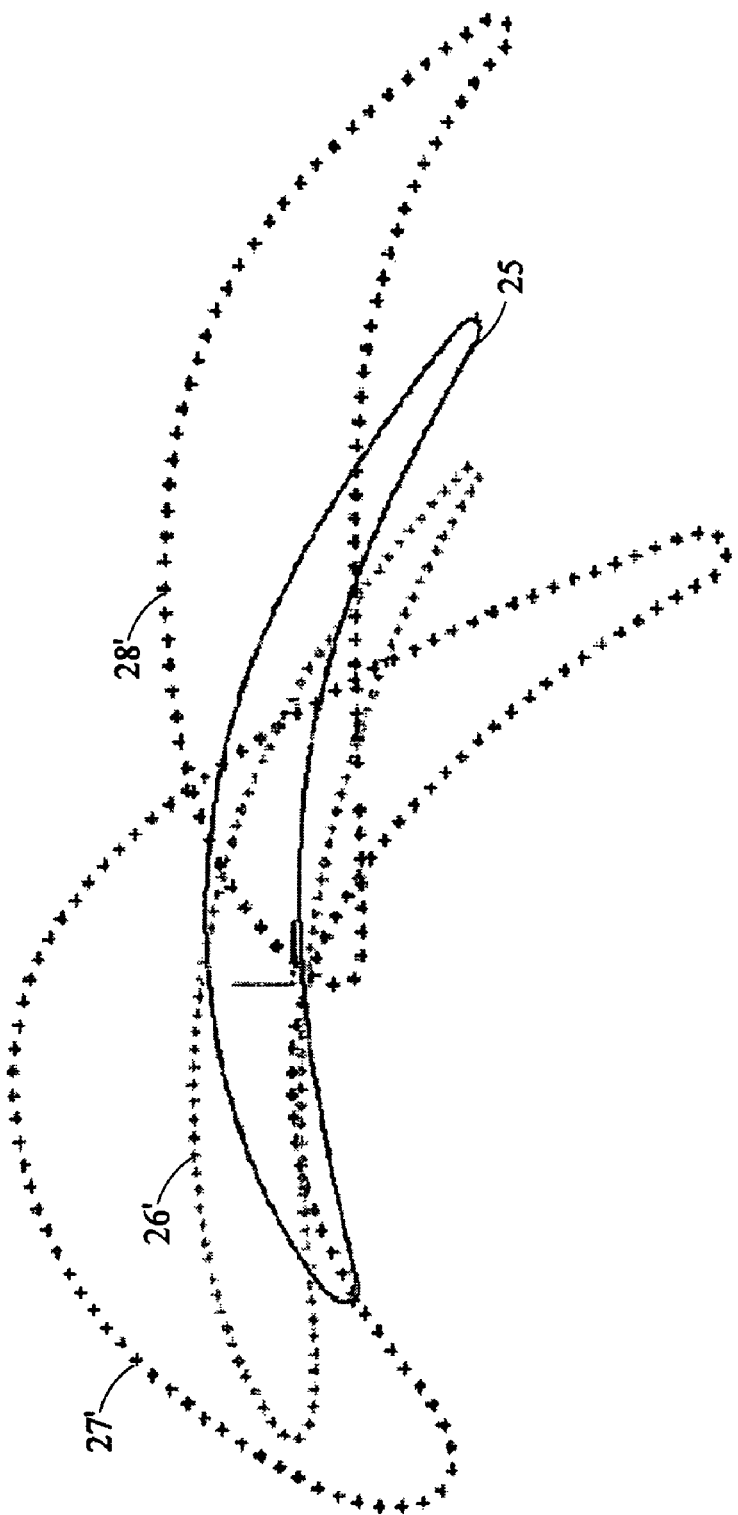

FIG. 2A shows an example reference airfoil divider cross section outline, 25, (shown in solid line form) and three different example comparison airfoil divider cross section outlines, 26, 27 and 28, (shown in points outline form) all located at the first section from the airfoil root reference end of the radial length extents involved for each of these airfoils. In FIG. 2B, the results of scaling (without reorienting) the comparison airfoils in this example are shown as scaled comparison airfoil divider cross section outlines, 26', 27' and 28'.

Figure 3:
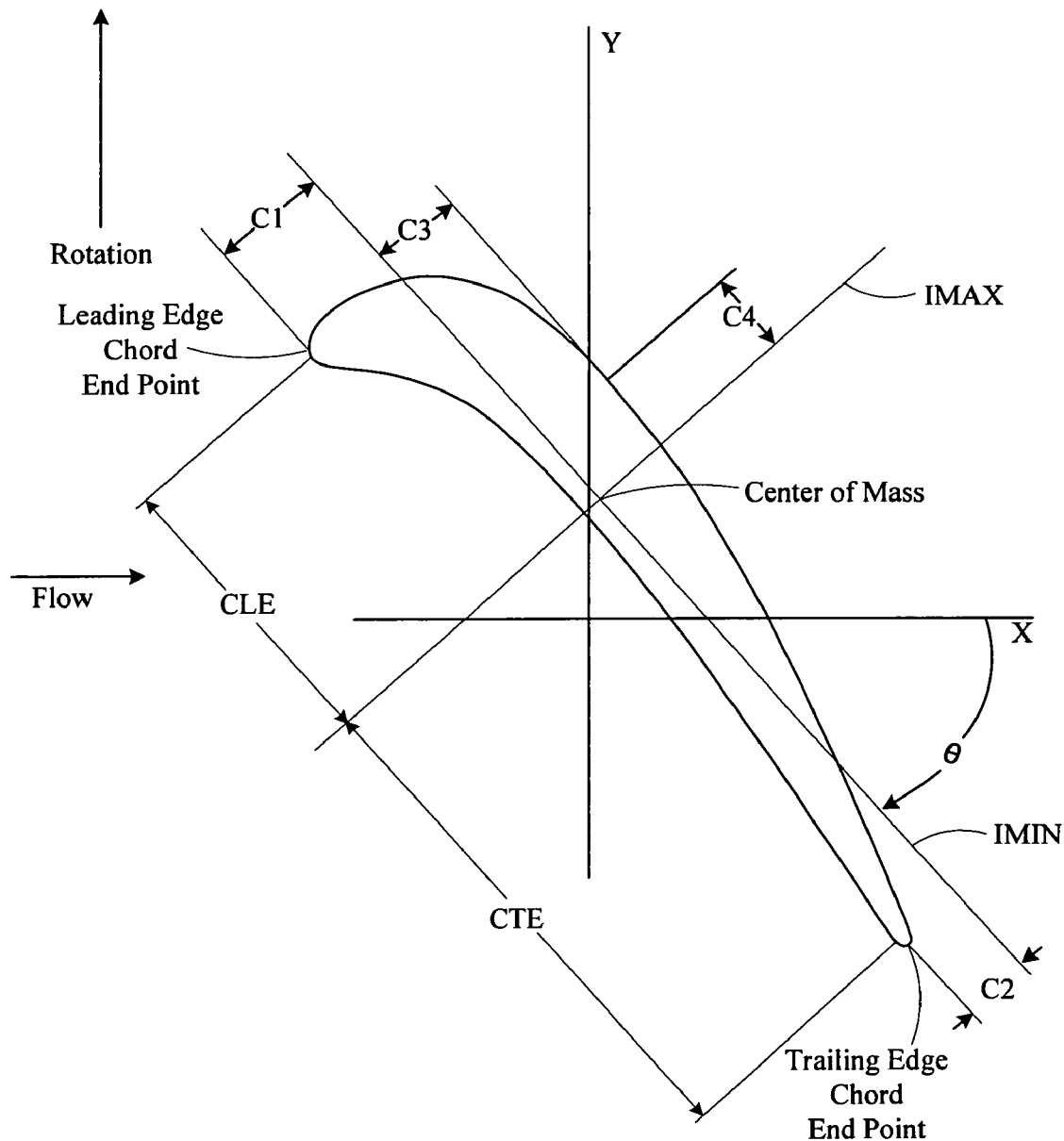
FIG. 3 shows an example representation of a geometrical outline of an airfoil indicating selected parameters thereof.
Figure 4:
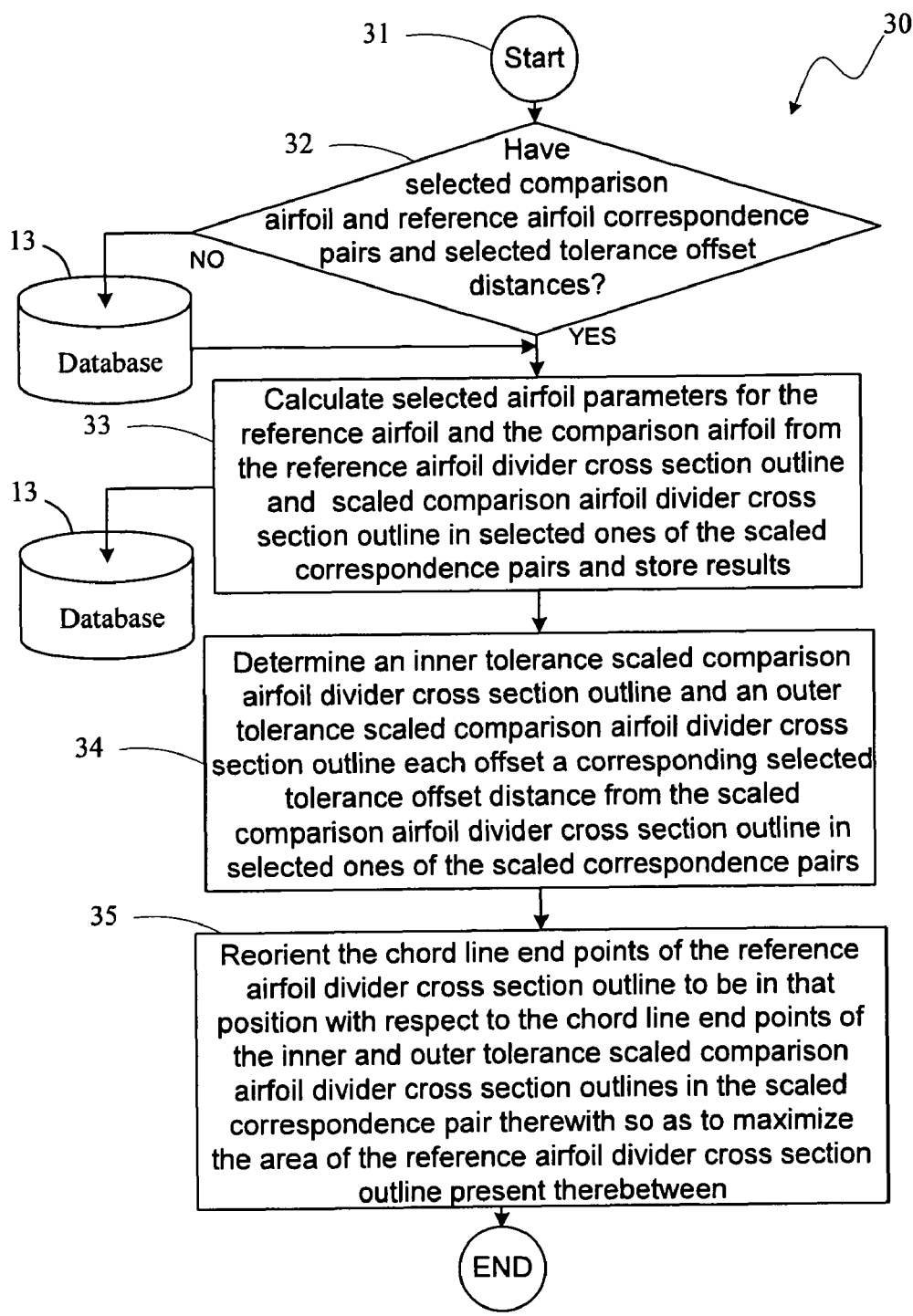
FIG. 4 shows a flow chart embodying therein an example continuation of the flow chart of FIGS. 1A and 1B.

Rather than relying only upon subjective visual comparisons between the members of scaled correspondence pairs to determine the degree of similarity between them, more objective computer system comparisons can made between these members for each pair by calculating a selected set of parameters characterizing each member. FIG. 3 shows an example airfoil with several typical parameters of interest indicated thereon that may be selected from for calculation by the computer system for each of the reference and the comparison airfoil divider cross section outlines in a scaled correspondence pair as a basis for a comparison between them. The leading and trailing edge chord line end points described above are shown in the figure but the mean line curve described above in connection therewith, and the chord line that extends therebetween, are omitted for clarity. Also not shown is the camber of the example airfoil which is the maximum distance from the mean line curve to the chord line in a direction normal to that chord line, and the camber angle which is the angle included between lines tangent to the mean line curve at the leading and trailing edge chord line end points.

The remaining parameters of interest are primarily geometrical parameters related to rotational behavior aspects and flexural strength aspects of airfoils. Generally, an inertia tensor can be found for a three dimensional airfoil with respect to the Cartesian coordinate system, and then a new set of coordinate axes are determined as the principal axes about which the airfoil mass is distributed most symmetrically to minimize the products of inertia and leave primarily the moments of inertia. However, in the current situation in which the reference and the comparison airfoil divider cross section outlines in a scaled correspondence pair represent corresponding adjacent airfoil sections with a uniform thickness that is ten percent of the corresponding airfoil length, some simplification is possible to reduce the amount of calculation needed.

Such airfoil sections, each adjacent to a corresponding one of the reference and the scaled comparison airfoil divider cross section outlines in any of the scaled correspondence pairs, can be considered to be a thin sheet in a two dimensional Cartesian coordinate system having the same outline shape as the corresponding one of reference and the scaled comparison airfoil divider cross section outlines, and with the section mass uniformly distributed over the area enclosed in that outline. Then the moment volume integrals usually encountered in determining the center of mass and the moments and products of inertia can then be taken as moment area integrals over the area bounded within the corresponding one of the reference and the scaled comparison airfoil divider cross section outlines which are readily evaluated by the computer system in well known manners (as well as determining the simple areas contained within those bounds).

Further simplification of the calculations comes from locating the center of mass in the areas within the reference and the scaled comparison airfoil divider cross section outlines first and, then determining the products and moments of inertia with respect to that center and another set of two dimensional orthogonal axes, other than the x- and y-axes, about which the products of inertia disappear. These two further axes are designated IMAX and IMIN in the airfoil example of FIG. 3 as the principal axes of that airfoil about which the corresponding principal centroidal moments of inertia IMAX and IMIN occur, and these axes intersect there at the airfoil center of mass with IMIN being at an angle θ with respect to the positive x-axis.

Similarly, material stiffness matrices generally found for a three dimensional airfoil with respect to the Cartesian coordinate system can be reduced to matrices corresponding to a two dimensional Cartesian coordinate system, and further simplified by being reduced to just involving bending moments with respect to IMIN which are readily evaluated by the computer system in well known manners. These involve determining the extreme fiber distances with respect to that axis, C1, C2, C3, C4, CLE and CTE, as indicated in FIG. 3. Any or all of these airfoil parameters can be determined by the computer system for any or all of the correspondence pairs as an objective indication of the degree of similarity between the reference and comparison airfoils.

This comparison methodology is presented for the foregoing example involving airfoils in a flow chart, 30, in FIG. 3 beginning at a start balloon, 31. However, the comparison can be made among a plurality of comparison airfoils and the reference airfoil if such other comparison airfoils have previously been put on the standardized bases described above so as to provide scaled correspondence pairs therefor in database 13 in the manner used in the above description for the example comparison airfoil. In addition, the presence of other reference airfoils in database 13 would, of course, also allow such comparison airfoils to be compared therewith.

The computer system first determines in a decision diamond, 32, in FIG. 3 whether it has the scaled comparison airfoil divider cross section outline and the reference airfoil divider cross section outline for each of the correspondence pairs, and the tolerance . . . offset distances, or whether that data must be first acquired from database 13. Thereafter, with this data, the computer system in a performance block, 33, calculates selected airfoil parameters for the reference airfoil and the comparison airfoil from these outlines in selected ones of the scaled correspondence pairs and store the results in database 13. The calculated airfoil parameters from the outlines are selected from (often, all are selected) among the airfoil outline area, the x- and y-axes coordinates of the airfoil outline center of mass, the airfoil outline camber and camber angle, the principal axes, the principal centroidal moments of inertia, and the extreme fiber location distances perpendicular to the principal axis IMIN with the determinations of the area, coordinates and moments involving numerical integration over the areas bounded by the outlines.

Next, in a performance block, 34, the computer system determines an inner tolerance scaled comparison airfoil divider cross section outline inside of the scaled comparison airfoil divider cross section outline and an outer tolerance scaled comparison airfoil divider cross section outline outside the scaled comparison airfoil divider cross section outline. Each of the inner and outer tolerance scaled comparison airfoil divider cross section outlines is offset a selected tolerance offset distance along perpendicular axes extending from the scaled comparison airfoil divider cross section outline member in those selected ones (often, all) of the scaled correspondence pairs for which a corresponding comparison airfoil tolerance band is to be determined as formed by the separation area between the inner and outer tolerance scaled comparison airfoil divider cross section outlines. Such perpendicular directions to scaled comparison airfoil divider cross section outline members are each found from determining a local tangent at the location desired on the outline for such a perpendicular to that outline, and then determining a direction perpendicular thereto in the plane of the outline.

A further measure of similarity between the members of the scaled correspondence pairs then is the determination of the fraction of the area of the reference airfoil divider cross section outline member that can be fitted to be within the comparison airfoil tolerance band found for the corresponding scaled comparison airfoil divider cross section outline member in the same correspondence pair. Thus, in a further performance block, 35, the computer system reorients the chord line end points of the reference airfoil divider cross section outline to place that outline in a best position with respect to the chord line end points of the inner and outer tolerance scaled comparison airfoil divider cross section outlines in the scaled correspondence pair therewith. This best position maximize the area of the reference airfoil divider cross section outline in the comparison airfoil tolerance band, that is, finds the position for the reference airfoil divider cross section outline that minimizes any portion thereof outside this band. Of course, with the data for correspondence pairs available to the computer system, other kinds of analyses concerning the representations of the reference and comparison airfoils in those correspondence pairs can additionally be undertaken by that system.

Although the present invention has been described with reference to preferred embodiments, workers skilled in the art will recognize that changes may be made in form and detail without departing from the spirit and scope of the invention.

The invention claimed is:

1. A method for comparing a plurality of geometrical data representations each representing a spatial boundary surface of a corresponding geometrical object which surface changes over a selected extent of the object bounded thereby, the method comprising:

providing the plurality of geometrical data representations on a common format basis, including scaling so as to each to have a common selected extent, to thereby result in a plurality of standardized spatial boundary surface geometrical data representations;

selecting a plurality of section locations along each of the common selected extents of the standardized spatial boundary surface geometrical data representations so as to have the section locations along each common selected extent of a corresponding standardized spatial boundary surface geometrical data representation matched to selected section locations along each of the remaining common selected extents of others plurality of standardized spatial boundary surface geometrical data representations, resulting in matched section locations, providing a plurality of section outline curve representations for each of the plurality of standardized spatial boundary surface geometrical data representations about selected ones of the matched section locations;

determining a pair of endpoints for each of the plurality of section outline curve representations at the selected ones of the matched section locations for each of the plurality of standardized spatial boundary surface geometrical data representations, and chord lengths between each of the pairs of endpoints;

scaling the section outline curve representations to each have a common chord length at a corresponding selected matched section locations for each of the plurality of standardized spatial boundary surface geometrical data representations to form commonly scaled section outline curve representations for the corresponding of the selected matched section locations from each of the plurality of standardized spatial boundary surface geometrical data representations; and comparing selected features of the commonly scaled section outline curve representations for the corresponding selected matched section locations to provide a representation of an indication of similarity; and scaling the section outline curve representations to each have a common chord length at another corresponding selected matched section locations for each of the plurality of standardized spatial boundary surface geometrical data representations to form commonly scaled section outline curve representations for another corresponding selected matched section locations from each of the plurality of standardized spatial boundary surface geometrical data representations.

2. The method of claim 1 wherein the comparing selected features of the commonly scaled section outline curve representations for the corresponding selected matched section locations comprises calculating selected parameters based at least in part on using numerical integration over areas bounded by the commonly scaled section outline curve representations.

3. The method of claim 1 further comprising forming tolerance offset boundary curves a selected distance on either side of a selected one of the commonly scaled section outline curve representations to provide a tolerance band therebetween, and reorienting any not selected one of the commonly scaled section outline curve representations to fit within the tolerance band with as little thereof as possible outside the tolerance band.

4. The method of claim 1 further comprising orienting the commonly scaled section outline curve representations for the selected matched section locations to each have common chord length of the commonly scaled section outline curve representations extending along a common direction.

5. The method of claim 4 further comprising forming tolerance offset boundary curves a selected distance on either side of a selected one of the commonly scaled section outline curve representations to provide a tolerance band therebetween, and reorienting any not selected one of the commonly scaled section outline curve representations to fit within the tolerance band with as little thereof as possible outside the tolerance band.

6. The method of claim 1 wherein a plurality of the geometrical data representations each include a plurality of cross section curves represented as points outlines and the providing of the plurality of geometrical data representations on a common format basis comprises providing an interpolated curve for each of a plurality of the points outline using concave and convex cubic splines and selecting a standardized points outline for each of the plurality of geometrical data representation therefrom with points positioned in a predetermined standardized pattern.

7. The method of claim 6 wherein the providing of the plurality of geometrical data representations on a common format basis further comprises providing a faired surface through the plurality of standardized points outlines interpolated therebetween using cubic splines to form a corresponding standardized spatial boundary surface geometrical data representation.

8. The method of claim 1 wherein at least one of the geometrical data representations include cross section curves represented as points outlines and the providing of the plurality of geometrical data representations on a common format basis includes repositioning points in a points outline.

9. The method of claim 8 wherein a plurality of the geometrical data representations each include a plurality of cross section curves represented as points outlines and the providing of the plurality of geometrical data representations on a common format basis comprises providing an interpolated curve for each of a plurality of the points outlines using concave and convex cubic splines and for each of the points outlines selecting a standardized points outline therefrom with points positioned in a predetermined standardized pattern.

10. The method of claim 9 wherein the providing of the plurality of geometrical data representations on a common format basis further comprises providing a faired surface through the plurality of standardized points outlines interpolated therebetween using cubic splines to form a corresponding standardized spatial boundary surface geometrical data representation.

11. The method of claim 1 wherein at least one of the geometrical data representations include cross section curves represented as points outlines and the providing of the plurality of geometrical data representations on a common format basis includes adding points in a points outline.

12. The method of claim 11 wherein a plurality of the geometrical data representations each include a plurality of cross section curves represented as points outlines and the providing of the plurality of geometrical data representations on a common format basis comprises providing an interpolated curve for each of a plurality of the points outline using concave and convex cubic splines and for each of the points outlines selecting a standardized points outline therefrom with points positioned in a predetermined standardized pattern.

13. The method of claim 11 wherein at least one of the geometrical data representations include cross section curves represented as points outlines and the providing of the plurality of geometrical data representations on a common format basis includes repositioning points in a points outline.

14. The method of claim 12 wherein the providing of the plurality of geometrical data representations on a common format basis further comprises providing a faired surface through the plurality of standardized points outlines interpolated therebetween using cubic splines to form a corresponding standardized spatial boundary surface geometrical data representation.

15. The method of claim 13 wherein a plurality of the geometrical data representations each include a plurality of cross section curves represented as points outlines and the providing of the plurality of geometrical data representations on a common format basis comprises providing an interpolated curve for each of a plurality of the points outlines using concave and convex cubic splines and selecting a standardized points outline therefrom with points positioned in a predetermined standardized pattern.

16. The method of claim 15 wherein the providing of the plurality of geometrical data representations on a common format basis further comprises providing a faired surface through the plurality of standardized points outlines interpolated therebetween using cubic splines to form a corresponding standardized spatial boundary surface geometrical data representation.

17. The method of claim 16 further comprising scaling the section outline curve representations to each have a common chord length at another corresponding one of the selected matched section locations for each of the plurality of standardized spatial boundary surface geometrical data representations to form commonly scaled section outline curve representations for the selected matched section locations from each of the plurality of standardized spatial boundary surface geometrical data representations.

18. The method of claim 16 wherein the comparing selected features of the commonly scaled section outline curve representations for the corresponding selected matched section locations comprises calculating selected parameters based at least in part on using numerical integration over areas bounded by the commonly scaled section outline curve representations.

* * * * *

UNITED STATES PATENT AND TRADEMARK OFFICE
CERTIFICATE OF CORRECTION

| | | |
|---|---|---|
| PATENT NO. | : 8,184,909 B2 | Page 1 of 1 |
| APPLICATION NO. | : 12/215070 | |
| DATED | : May 22, 2012 | |
| INVENTOR(S) | : Michael S. Miarecki and Jeffrey D. Lancaster | |

It is certified that error appears in the above-identified patent and that said Letters Patent is hereby corrected as shown below:

Col. 9, Line 51
  Delete "outline"
  Insert --outlines--

Col. 9, Line 54
  Delete "representation"
  Insert --representations--

Signed and Sealed this
Fourteenth Day of August, 2012

David J. Kappos
*Director of the United States Patent and Trademark Office*